(No Model.)

H. FERGUSON.
SAW JOINTING DEVICE.

No. 252,090. Patented Jan. 10, 1882.

Attest:
A. Barthel
E. Scully

Inventor:
Harvey Ferguson
by Thos. S. Sprague
Atty

United States Patent Office.

HARVEY FERGUSON, OF LEETSVILLE, MICHIGAN.

SAW-JOINTING DEVICE.

SPECIFICATION forming part of Letters Patent No. 252,090, dated January 10, 1882.

Application filed May 25, 1881. (No model.)

*To all whom it may concern:*

Be it known that I, HARVEY FERGUSON, of Leetsville, Kalkaska county, Michigan, have invented an Improvement in Saw-Jointers, of which the following is a specification.

The nature of this invention relates to certain new and useful improvements in the construction of devices to be used in the pointing of crosscut-saw teeth; and the invention consists in the peculiar construction, arrangement, and combination of the various parts, all as more fully hereinafter set forth.

Figure 1:
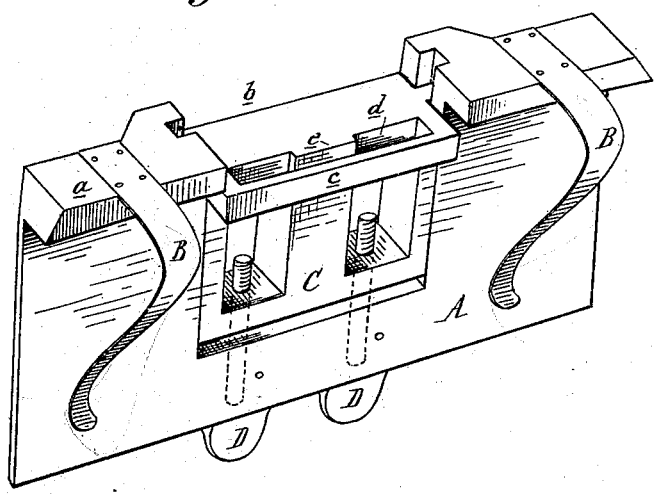
Figure 2:
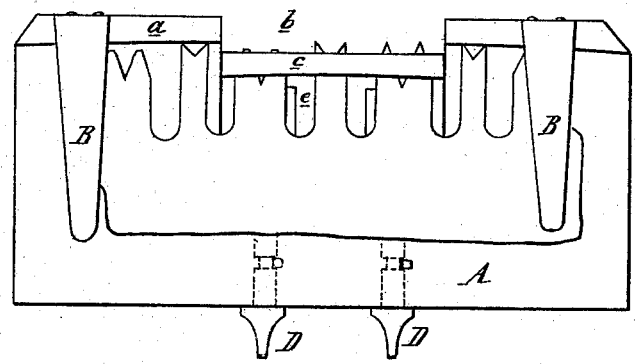

In the accompanying drawings, which form a part of this specification, and in which my invention is shown in perspective in Figure 1 and in plan in Fig. 2, A represents a suitable plate provided with a flange, $a$, upon one edge. To this flange are secured one end of the springs B, the opposite ends of which press upon the side of the plate. A rectangular opening, $b$, is formed in the plate A. Within this opening there is arranged the slide C, which is operated by the thumb-screws D, passing through the body of the plate A. This plate C is provided with a flange, $c$, similar to the flange $a$, and through such flange $c$ is formed a slot, $d$, leaving the projection $e$ upon the body of the slide.

In operation this device, when intended for regulating the length of the cutting-teeth of a crosscut-saw, is placed upon such saw, the springs holding it to the position desired, with the intermediate raker-tooth resting upon the projection $e$, the cutting-teeth projecting through the slot $c$ the desired length, when they may be readily filed off flush with the face of the slide C, and by repeating this operation the entire length of the saw the cutting-teeth may readily be brought to a straight line. To joint or point the rakers the cutting-teeth should rest upon the projection $e$, while the rakers project through the slot $c$, where they may be readily filed off in a similar manner.

By the use of this device I am enabled to quickly and easily joint the teeth and rakers of a crosscut saw, gaging their lengths as may be desired.

What I claim as my invention is—

In a saw-jointer, and in combination with a plate, A, thereof, provided with a flange, $a$, and springs B, the adjustable slide provided with a slotted flange, $b$, and a thumb-screw, D, substantially as and for the purposes specified.

HARVEY FERGUSON.

Witnesses:
ALLEN LANNIN,
HENRY LANNIN.